(12) United States Patent
Song et al.

(10) Patent No.: US 10,589,229 B2
(45) Date of Patent: Mar. 17, 2020

(54) CENTRAL TUBE COMPONENT OF FILTER ELEMENT AND MANUFACTURING METHOD THEREOF

(71) Applicant: FOSHAN MIDEA CHUNGHO WATER PURIFICATION EQUIPMENT CO., LTD., Foshan (CN)

(72) Inventors: Guodong Song, Foshan (CN); Xuegang Cai, Foshan (CN); Peng Gui, Foshan (CN)

(*) Notice: Subject to any disclaimer, the term of this patent is extended or adjusted under 35 U.S.C. 154(b) by 141 days.

(21) Appl. No.: 15/749,787

(22) PCT Filed: Dec. 30, 2015

(86) PCT No.: PCT/CN2015/099917
§ 371 (c)(1),
(2) Date: Feb. 2, 2018

(87) PCT Pub. No.: WO2017/020524
PCT Pub. Date: Feb. 9, 2017

(65) Prior Publication Data
US 2019/0022589 A1 Jan. 24, 2019

(30) Foreign Application Priority Data

Aug. 3, 2015 (CN) .......................... 2015 1 0481968
Aug. 3, 2015 (CN) ...................... 2015 2 0593083 U
Aug. 3, 2015 (CN) ...................... 2015 2 0593260 U

(51) Int. Cl.
*B01D 61/10* (2006.01)
*B01D 63/00* (2006.01)
(Continued)

(52) U.S. Cl.
CPC .............. *B01D 61/10* (2013.01); *B01D 61/00* (2013.01); *B01D 63/00* (2013.01); *B01D 63/103* (2013.01);
(Continued)

(58) Field of Classification Search
CPC ........ B01D 61/10; B01D 63/00; B01D 61/00; B01D 63/103; B01D 2313/086;
(Continued)

(56) References Cited

U.S. PATENT DOCUMENTS

| 2010/0096319 A1* | 4/2010 | Beauchamp ........... B01D 63/10 |
| | | 210/500.23 |
| 2013/0105023 A1* | 5/2013 | Janssen .................. B01D 63/10 |
| | | 138/111 |
| 2015/0157984 A1 | 6/2015 | Uda et al. |

FOREIGN PATENT DOCUMENTS

| CN | 101545797 A | 9/2009 |
| CN | 202151550 U | 2/2012 |

(Continued)

OTHER PUBLICATIONS

CN First Office Action dated Dec. 5, 2016 in the corresponding CN application(application No. 201510481968.5).
(Continued)

*Primary Examiner* — Krishnan S Menon
*Assistant Examiner* — Waqaas Ali
(74) *Attorney, Agent, or Firm* — Kilpatrick Townsend & Stockton, LLP

(57) ABSTRACT

A central tube assembly for a filter cartridge and a manufacturing method for the central tube assembly are provided. The central tube assembly includes a first half-tube defines a first flow passage, and having a first water inlet at an end thereof and a water output hole in a side wall thereof a filtering membrane bent to form a first membrane layer and
(Continued)

a second membrane layer, the first half-tube being disposed between the first membrane layer and the second membrane layer; an input-water filtering net connected to the first half-tube and disposed between the first membrane layer and the second membrane layer a second half-tube disposed outside of a bending of the filtering membrane, defining a second flow passage, and having a water input hole in a side wall thereof and a first water outlet at an end thereof and a produced-water filtering net.

10 Claims, 7 Drawing Sheets

(51) Int. Cl.
  *C02F 1/44* (2006.01)
  *B01D 61/00* (2006.01)
  *B01D 63/10* (2006.01)

(52) U.S. Cl.
  CPC .......... *C02F 1/44* (2013.01); *B01D 2313/086* (2013.01); *B01D 2313/10* (2013.01); *B01D 2313/12* (2013.01); *C02F 1/445* (2013.01)

(58) Field of Classification Search
  CPC ... B01D 2313/10; B01D 2313/12; C02F 1/44; C02F 1/445
  See application file for complete search history.

(56) References Cited

FOREIGN PATENT DOCUMENTS

| | | |
|---|---|---|
| CN | 203710924 U | 7/2014 |
| CN | 104258733 A | 1/2015 |
| CN | 204816235 U | 12/2015 |
| WO | 2015099345 A1 | 7/2015 |

OTHER PUBLICATIONS

International Search Report dated May 5, 2016 in the corresponding CN application (application No. PCT/CN2015/099917).
European Search Report dated Jun. 19, 2018 in the corresponding European application (application No. 15900287.2).
EP Office Action dated Sep. 16, 2019 in the corresponding EP application (application No. 15900287.2).

* cited by examiner

CENTRAL TUBE COMPONENT OF FILTER ELEMENT AND MANUFACTURING METHOD THEREOF

CROSS-REFERENCE TO RELATED APPLICATION

This application is a national phase entry under 35 USC § 371 of International Application PCT/CN2015/099917, filed Dec. 30, 2015, which claims priority to and benefits of Chinese Patent Application Serial No. 201520593260.4, 201510481968.5 and 201520593083.X, filed with the State Intellectual Property Office of P. R. China on Aug. 3, 2015, the entire contents of which are incorporated herein by reference.

FIELD

The present disclosure relates to a technical field of water purification devices, and more particularly to a central tube assembly for a filter cartridge and a manufacturing method thereof.

BACKGROUND

Filtration technologies in the current household water purifier market generally include a microfiltration technology, an ultrafiltration technology, an ion exchange technology, an adsorption technology and a reverse osmosis (RO)/nano-filtration (NF) technology. For the RO/NF, the core component is a RO/NF membrane element. Compared with an industrial membrane element, the membrane in a household water purifier has a short flow passage. A water feeding manner for a traditional membrane element is that raw water is introduced in and concentrated water is discharged out in a direction parallel to a purified-water collection tube (a central tube). Since the flow passage is relatively short, the flowing speed in the membrane is poor in the case of equal water inlet flow, such that the membrane surface tends to produce a strong concentration polarization, and hence to be polluted, thus resulting in a low water use efficiency of the existing household water purifier.

SUMMARY

Embodiments of the present disclosure seek to solve at least one of the problems existing in the related art to at least some extent.

For that reason, the present disclosure provides a central tube assembly for a filter cartridge. The central tube assembly is simple in structure, convenient for moldmaking, suitable for mass production, high in water flowing speed, and not easy to be polluted.

The present disclosure also provides a manufacturing method for a central tube assembly for a filter cartridge.

The central tube assembly for the filter cartridge according to embodiments of a first aspect of the present disclosure includes a first half-tube, the first half-tube having a first flow passage extending in an axial direction of the first half-tube, an end of the first half-tube having a first water inlet communicated with the first flow passage, a side wall of the first half-tube having a water output hole communicated with the first flow passage; a filtering membrane, the filtering membrane having a side formed as a raw-water side and another side formed as a produced-water side, the filtering membrane being bent towards the raw-water side to form a first membrane layer and a second membrane layer, the first half-tube being disposed between the first membrane layer and the second membrane layer and adjacent to a bending position; an input-water filtering net, the input-water filtering net being connected with the first half-tube, the input-water filtering net being disposed between the first membrane layer and the second membrane layer, so as to define a waste water passage between the first membrane layer and the second membrane layer; a second half-tube, the second half-tube being disposed outside of a bending of the filtering membrane and adjacent to the first half-tube, the second half-tube having a second flow passage extending in an axial direction of the second half-tube, a side wall of the second half-tube having a water input hole communicated with the second flow passage, an end of the second half-tube having a first water outlet communicated with the second flow passage; a produced-water filtering net, the produced-water filtering net being connected with the second half-tube, the produced-water filtering net, the first membrane layer and the second membrane layer being coiled on the first half-tube and the second half-tube in a same direction, so as to fix the first half-tube with the second half-tube, the produced-water filtering net being disposed between the first membrane layer and the second half-tube, so as to define a purified water passage between the first membrane layer and the second half-tube, in which the purified water passage is communicated with the water input hole.

In the central tube assembly for the filter cartridge according to embodiments of the present disclosure, the central tube is constituted by two pipe bodies, i.e. the first half-tube and the second half-tube. After the raw water enters the central tube, during operations of the membrane elements, the flowing direction of water is all along perpendicular to the direction of the central tube, such that negative effects caused by changes of a direction of a flowing speed in the membrane can be avoided while ensuring the flowing speed in the membrane, and a pollution-resistance property of the membrane is improved under the premise of mass production.

In addition, the central tube assembly for the filter cartridge according to embodiments of the present disclosure also includes following additional technical features.

According to an embodiment of the present disclosure, the central tube assembly for the filter cartridge further includes: an upper-end cover, the upper-end cover having a second water inlet communicated with the first water inlet and a second water outlet communicated with the first water outlet, the upper-end cover being fitted over upper ends of the first half-tube and the second half-tube, the upper-end cover tightly pressing an upper end of the filtering membrane, so as to seal an upper end of the central tube assembly; and a lower-end cover, the lower-end cover being fitted over lower ends of the first half-tube and the second half-tube, the lower-end cover tightly pressing a lower end of the filtering membrane, so as to seal a lower end of the central tube assembly.

According to an embodiment of the present disclosure, a section of the first half-tube and a section of the second half-tube each have a semicircle shape, the water output hole is provided in an arc surface of the first half-tube, the water input hole is provided in an arc surface of the second half-tube, and a flat surface of the first half-tube is arranged opposite to a flat surface of the second half-tube.

According to an embodiment of the present disclosure, a surface of the first half-tube, which is arranged opposite to the second half-tube, is slotted and provided with the first flow passage, and a surface of the second half-tube, which is arranged opposite to the first half-tube, is slotted and provided with the second flow passage.

According to an embodiment of the present disclosure, at least one of a surface of the first half-tube and a surface of the second half-tube is provided with a reinforcing rib, in which the surface of the first half-tube is arranged opposite to the surface of the second half-tube, and the reinforcing rib abuts against the filtering membrane.

According to an embodiment of the present disclosure, two ends of the first half-tube each are provided with a first pre-mounting portion beyond the filtering membrane, two ends of the second half-tube each are provided with a second pre-mounting portion beyond the filtering membrane, and the first pre-mounting portion is connected to the second pre-mounting portion before the filtering membrane is coiled.

According to an embodiment of the present disclosure, the first pre-mounting portion includes a first upper fitting part provided at an upper end of the first half-tube and a first lower fitting part provided at a lower end of the first half-tube, the second pre-mounting portion includes a second upper fitting part provided at an upper end of the second half-tube and a second lower fitting part provided at a lower end of the second half-tube, the first upper fitting part and the second upper fitting part are corresponding in structure and connected to form a cylindrical structure, and the first lower fitting part and the second lower fitting part are corresponding in structure and connected to form a cylindrical structure.

According to an embodiment of the present disclosure, the first pre-mounting portion further includes a first upper bonding part provided at the upper end of the first half-tube and a first lower bonding part provided at the lower end of the first half-tube, the first upper bonding part is located below the first upper fitting part, and the first lower bonding part is located above the first lower fitting part; the second pre-mounting portion further includes a second upper bonding part provided at the upper end of the second half-tube and a second lower bonding part provided at the lower end of the second half-tube, the second upper bonding part is located below the second upper fitting part, and the second lower bonding part is located above the second lower fitting part.

According to an embodiment of the present disclosure, the first upper bonding part and the second upper bonding part each are provided with a sealing glue layer, and the first lower bonding part and the second lower bonding part each are provided with a sealing glue layer.

According to an embodiment of the present disclosure, the first pre-mounting portion is integrally formed with the first half-tube, and the second pre-mounting portion is integrally formed with the second half-tube.

According to an embodiment of the present disclosure, a distance between the second water inlet of the upper-end cover and the second water outlet of the upper-end cover is 20-50 mm.

According to an embodiment of the present disclosure, a lower surface of the upper-end cover and an upper surface of the lower-end cover each are provided with a sealing glue layer.

The manufacturing method for the central tube assembly for the filter cartridge according to embodiments of a second aspect of the present disclosure includes following steps: S1, bending a filtering membrane towards a raw-water side, so as to form a first membrane layer and a second membrane layer, connecting an input-water filtering net with a first half-tube and arranging the input-water filtering net connected with the first half-tube between the first membrane layer and the second membrane layer and adjacent to a bending position of the filtering membrane; S2, connecting a produced-water filtering net with a second half-tube, arranging the second half-tube adjacent to the first half-tube and outside of a bending of the filtering membrane, connecting an upper end of the first half-tube with an upper end of the second half-tube, and connecting a lower end of the first half-tube with a lower end of the second half-tube; S3, coiling the produced-water filtering net, the first membrane layer and the second membrane layer on the first half-tube and the second half-tube in a same direction, so as to fix the first half-tube with the second half-tube; S4, fitting an upper-end cover over upper ends of the first half-tube and the second half-tube, tightly pressing the upper end of the filtering membrane, fitting a lower-end cover over lower ends of the first half-tube and the second half-tube, tightly pressing a lower end of the filtering membrane, thereby obtaining the central tube assembly.

According to an embodiment of the present disclosure, the two ends of the first half-tube each are provided with a first pre-mounting portion beyond the filtering membrane, the two ends of the second half-tube each are provided with a second pre-mounting portion beyond the filtering membrane, the first pre-mounting portion and the second pre-mounting portion are connected before the filtering membrane is coiled, and the first pre-mounting portion and the second pre-mounting portion are cut off after the filtering membrane completes coiling.

According to an embodiment of the present disclosure, step S4 further includes following steps: S41, coating glue on a lower surface of the upper-end cover and on an upper surface of the lower-end cover; S42, fitting the upper-end cover over the upper ends of the first half-tube and the second half-tube, tightly pressing the upper end of the filtering membrane by the upper-end cover to form a sealing glue layer, fitting the lower-end cover over the lower ends of the first half-tube and the second half-tube, tightly pressing the lower end of the filtering membrane by the lower-end cover to form a sealing glue layer, thereby obtaining the central tube assembly.

BRIEF DESCRIPTION OF THE DRAWINGS

Embodiments of the present disclosure will become apparent and more readily appreciated from the following descriptions made with reference to the drawings, in which.

REFERENCE NUMERALS

Figure 1:
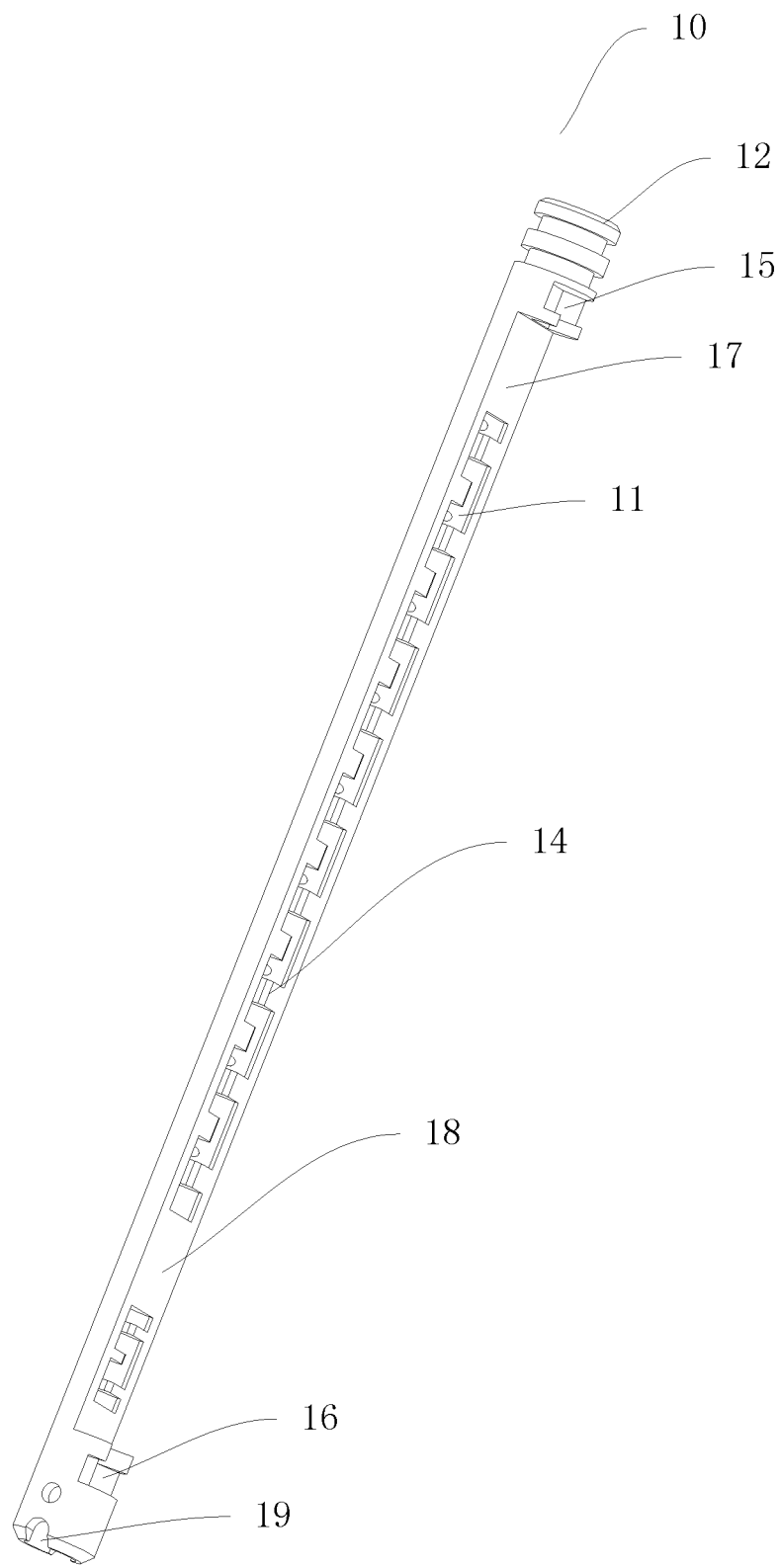
FIG. 1 is a schematic view of a first half-tube of a central tube assembly according to embodiments of the present disclosure.
Figure 2:
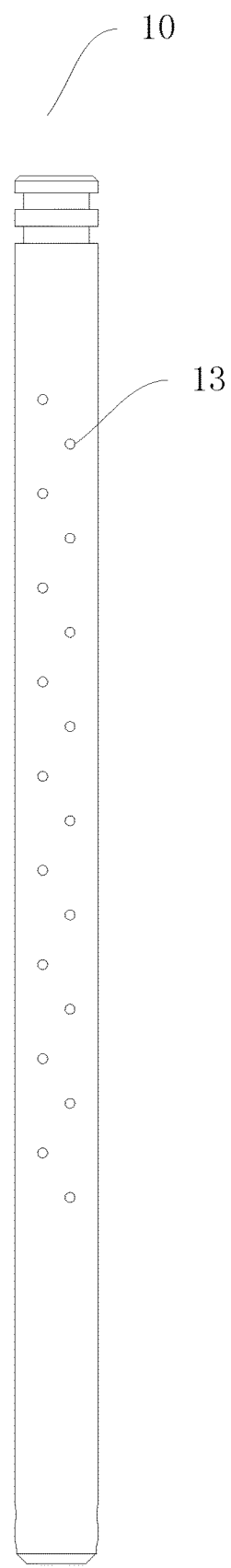
FIG. 2 is a side view of a first half-tube of a central tube assembly according to embodiments of the present disclosure.

Central tube assembly 100;
First half-tube 10; first flow passage 11; first water inlet 12; water output hole 13; reinforcing rib 14; first upper fitting part 15; first lower fitting part 16; first upper bonding part 17; first lower bonding part 18; tooling bayonet 19;
Second half-tube 20; second flow passage 21; water input hole 22; first water outlet 23; second upper fitting part 25; second lower fitting part 26; second upper bonding part 27; second lower bonding part 28;
Filtering membrane 30; input-water filtering net 40; produced-water filtering net 50;
Upper-end cover 60; second water inlet 61; second water outlet 62;
Lower-end cover 70.

DETAILED DESCRIPTION

Embodiments of the present disclosure will be described in detail in the following. Examples of the embodiments are illustrated in the accompanying drawings. The same or similar elements and the elements having same or similar functions are denoted by like reference numerals throughout the descriptions. The embodiments described herein with reference to drawings are explanatory and used to generally understand the present disclosure. The embodiments shall not be construed to limit the present disclosure.

A central tube assembly 100 for a filter cartridge according to embodiments of the present disclosure will be described in detail with reference to the drawings in the following.

As shown in FIGS. 1-6, the central tube assembly 100 for the filter cartridge according to embodiments of the present disclosure includes a first half-tube 10, a second half-tube 20, a filtering membrane 30, an input-water filtering net 40, a produced-water filtering net 50, an upper-end cover 60, and a lower-end cover 70.

In one embodiment, the first half-tube 10 has a first flow passage 11 extending in an axial direction of the first half-tube 10. An end of the first half-tube 10 has a first water inlet 12 communicated with the first flow passage 11. A side wall of the first half-tube 10 has a water output hole 13 communicated with the first flow passage 11. The filtering membrane 30 has a side configured as a raw-water side and another side configured as a produced-water side. The filtering membrane 30 is bent towards the raw-water side to form a first membrane layer and a second membrane layer. The first half-tube 10 is disposed between the first membrane layer and the second membrane layer and adjacent to a bending position. The input-water filtering net 40 is connected with the first half-tube 10. The input-water filtering net 40 is disposed between the first membrane layer and the second membrane layer, so as to define a waste water passage between the first membrane layer and the second membrane layer.

The second half-tube 20 is disposed outside of a bending of the filtering membrane 30 and adjacent to the first half-tube 10. The second half-tube 20 has a second flow passage 21 extending in an axial direction of the second half-tube 20. A side wall of the second half-tube 20 has a water input hole 22 communicated with the second flow passage 21. An end of the second half-tube 20 has a first water outlet 23 communicated with the second flow passage 21. The produced-water filtering net 50 is connected with the second half-tube 20. The produced-water filtering net 50, the first membrane layer and the second membrane layer are wound on the first half-tube 10 and the second half-tube 20 in a same direction, so as to fix the first half-tube 10 and the second half-tube 20. The produced-water filtering net 50 is disposed between the first membrane layer and the second half-tube 20, so as to define a purified water passage between the first membrane layer and the second half-tube 20, in which the purified water passage is communicated with the water input hole 22.

The upper-end cover 60 has a second water inlet 61 communicated with the first water inlet 12 and a second water outlet 62 communicated with the first water outlet 23. The upper-end cover 60 is fitted over upper ends of the first half-tube 10 and the second half-tube 20. The upper-end cover 60 tightly presses an upper end of the filtering membrane 30, so as to seal an upper end of the central tube assembly. The lower-end cover 70 is fitted over lower ends of the first half-tube 10 and the second half-tube 20. The lower-end cover 70 tightly presses a lower end of the filtering membrane 30, so as to seal a lower end of the central tube assembly.

In other words, the central tube assembly 100 according to embodiments of the present disclosure mainly includes the first half-tube 10, the second half-tube 20, the filtering membrane 30, the input-water filtering net 40, the produced-water filtering net 50, the upper-end cover 60 and the lower-end cover 70. That is, the central tub is a cylindrical tube body constituted by the first half-tube 10 and the second half-tube 20 together.

The first half-tube 10 has the first flow passage 11 extending in the axial direction of the first half-tube 10. The end of the first half-tube 10 has the first water inlet 12 communicated with the first flow passage 11. The side wall of the first half-tube 10 has the water output hole 13 communicated with the first flow passage 11. The second half-tube 20 has the second flow passage 21 extending in the axial direction of the second half-tube 20. The end of the second half-tube 20 has the first water outlet 23 communicated with the second flow passage 21. The side wall of the second half-tube 20 has the water input hole 22 communicated with the second flow passage 21.

The filtering membrane 30 has two sides, one of the two sides is formed as the raw-water side, and the other one of the two sides is formed as the produced-water side. The filtering membrane 30 is folded towards the raw-water side to form the first membrane layer and the second membrane layer. The bending is formed in a position where the filtering membrane 30 is folded. The first half-tube 10 is disposed between the first membrane layer and the second membrane layer and adjacent to the bending position.

The input-water filtering net 40 is disposed between the first membrane layer and the second membrane layer and is connected with the first half-tube 10. After the input-water filtering net 40 and the filtering membrane 30 are coiled together, the waste water passage is defined between the first membrane layer and the second membrane layer. A raw water flowing out of the water output hole 13 of the first half-tube 10 flows to the waste water passage between the first membrane layer and the second membrane layer in a direction perpendicular to the first half-tube 10. After the raw water is filtered by the filtering membrane 30, the remaining waste water continues flowing outwards along the waste water passage, until it flows out of the central tube assembly 100.

The second half-tube 20 is adjacent to the first half-tube 10 and is located outside of the bending of the first membrane layer and the second membrane layer. The second half-tube 20 is connected with the produced-water filtering net 50. The produced-water filtering net 50 is coiled with the input-water filtering net 40 and the filtering membrane 30. The produced-water filtering net 50 is coiled between the filtering membrane 30 and the second half-tube 20, and the purified water passage is defined between the filtering membrane 30 and the second half-tube 20. The purified water passage is communicated with the water input hole 22 of the second half-tube 20.

After the raw water is filtered by the filtering membrane 30, the purified water obtained by filtration flows to the purified water passage in a direction perpendicular to the second half-tube 20, enters the second flow passage 21 through the water input hole 22, and flows out of the first water outlet 23, such that circulation directions of the raw water and the purified water in the membrane elements of the overall central tube assembly 100 both are perpendicular to the first half-tube 10 and the second half-tube 20, thus avoiding negative effects caused by changes of water flowing directions.

The upper-end cover 60 is fitted over the upper ends of the first half-tube 10 and the second half-tube 20. The second water inlet 61 of the upper-end cover 60 is fitted and communicated with the first water inlet 12. The second water outlet 62 of the upper-end cover 60 is fitted and communicated with the first water outlet 23. The upper-end cover 60 tightly presses the upper end of the filtering membrane 30 to form a closed structure, so as to seal the upper end of the central tube assembly. The lower-end cover 70 tightly presses the lower end of the filtering membrane 30 to form a closed structure, so as to seal the lower end of the central tube assembly. The central tube assembly 100 is fixed by the upper-end cover 60 and the lower-end cover 70 to form a structure which is sealed at top and bottom, thereby greatly improving the working efficiency and feasibility of assembling.

Thus, in the central tube assembly 100 for the filter cartridge according to embodiments of the present disclosure, the central tube is constituted by the first half-tube 10 and the second half-tube 20. After the raw water enters the central tube, during operations of the membrane elements, the flowing direction of water is all along perpendicular to the central tube, such that negative effects caused by changes of a direction of a flowing speed in the membrane can be avoided while ensuring the flowing speed in the membrane, a pollution-resistance property of the membrane is improved under the premise of mass production, and the assembling of the central tube assembly is achieved by the upper-end cover 60 and the lower-end cover 70, thus providing high assembling efficiency and facilitating mass production.

According to an embodiment of the present disclosure, a section of the first half-tube 10 and a section of the second half-tube 20 each have a semicircle shape. The water output hole 13 is provided to an arc surface of the first half-tube 10, the water input hole 22 is provided to an arc surface of the second half-tube 20, and a flat surface of the first half-tube 10 is arranged opposite to a flat surface of the second half-tube 20.

Thus, the first half-tube 10 having the semicircle section and the second half-tube 20 having the semicircle section can form a circular structure after being fitted with each other. The circular structure is similar to a cylindrical central tube structure of a traditional construction, is convenient to mount and can also be greatly fitted with devices of other traditional structures.

In one embodiment, the surface of the first half-tube 10, which is opposite to the second half-tube 20, is slotted and provided with the first flow passage 11, and the surface of the second half-tube 20, which is opposite to the first half-tube 10, is slotted and provided with the second flow passage 21.

Figure 3:
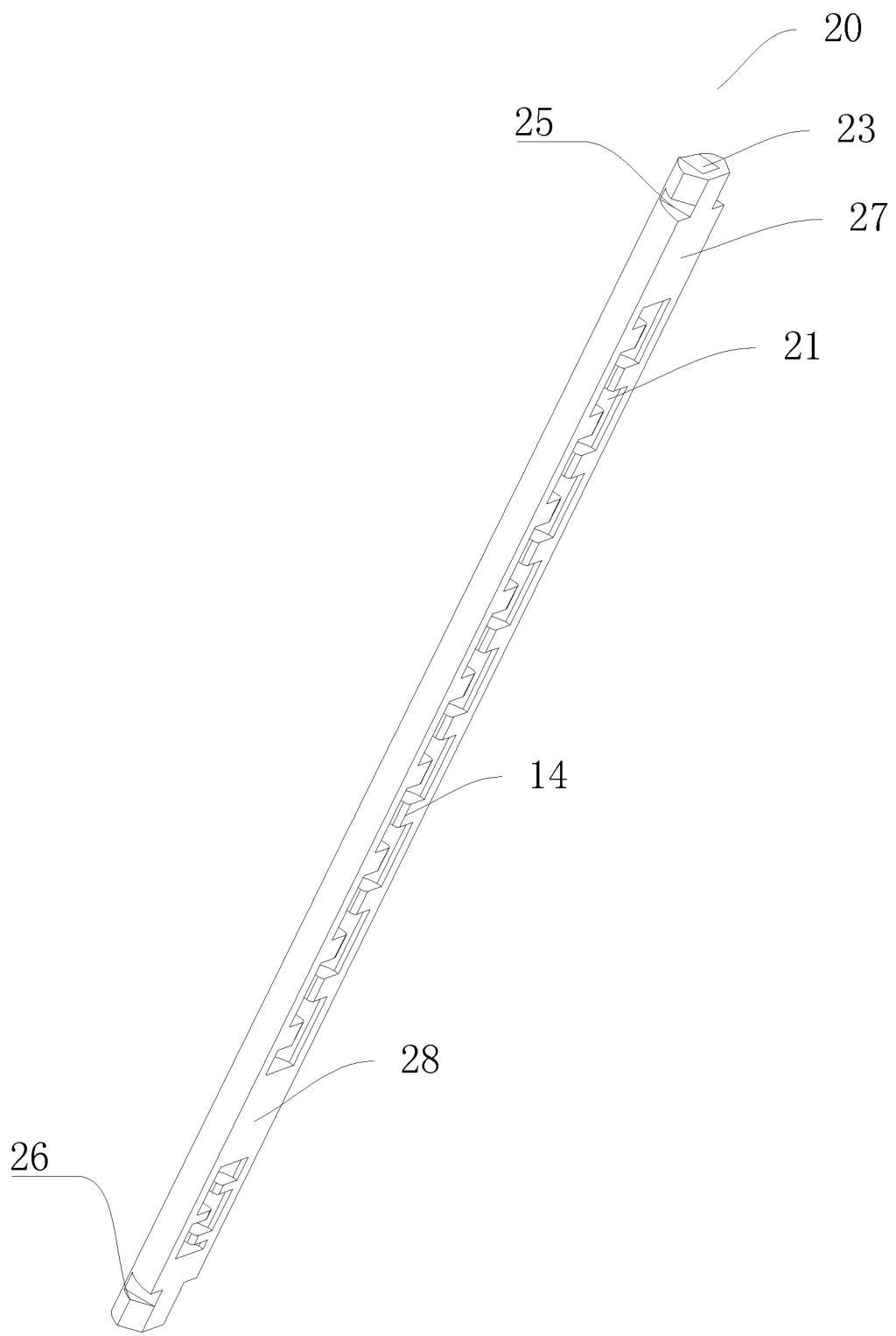
FIG. 3 is a schematic view of a second half-tube of a central tube assembly according to embodiments of the present disclosure.
Figure 4:
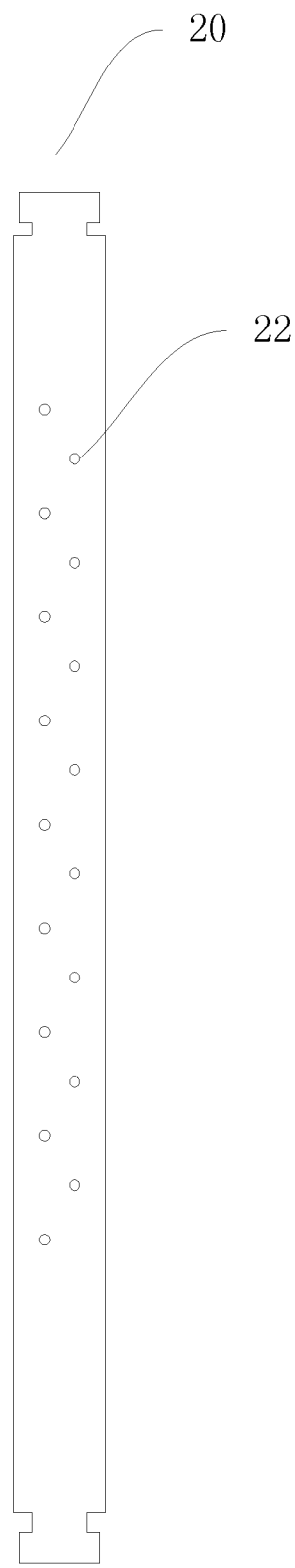
FIG. 4 is a side view of a second half-tube of a central tube assembly according to embodiments of the present disclosure.
Figure 5:
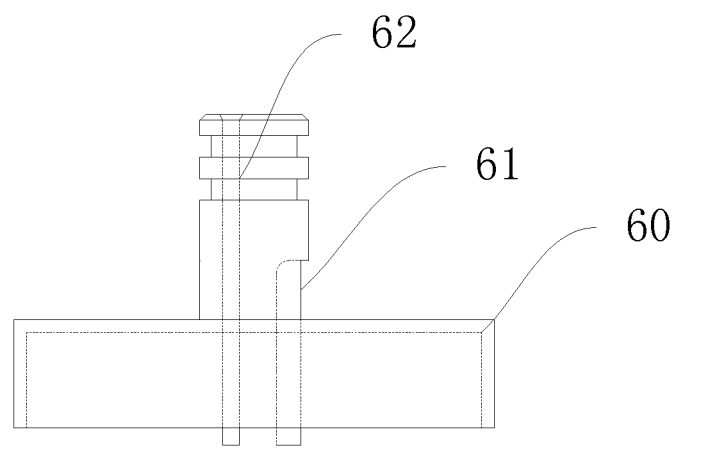
FIG. 5 is a schematic view of an upper-end cover and a lower-end cover of a central tube assembly according to embodiments of the present disclosure.
Figure 5:
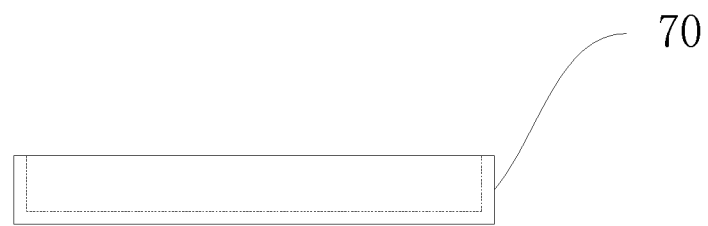

In one embodiment, as shown in FIGS. 1 and 3, in the present application, the first flow passage 11 in the first half-tube 10 and the second flow passage 21 in the second half-tube 20 can be formed by slotting respectively, thereby achieving the moldmaking production. Since the filtering membrane 30 is wrapped outside the first half-tube 10, even though the raw water entering the first flow passage 11 through the first water inlet 12 penetrates the filtering membrane 30 and flows into the second flow passage 21 of the second half-tube 20, the water flowing into the second flow passage 21 is the purified water and will not influence a normal use of the central tube assembly 100.

According to an embodiment of the present disclosure, at least one of the surface of the first half-tube 10 and the surface of the second half-tube 20 arranged opposite to the surface of the first half-tube 10 is provided with a reinforcing rib 14, and the reinforcing rib 14 abuts against the filtering membrane 30. In one embodiment, the surface of the first half-tube 10 and the surface of the second half-tube 20 arranged opposite to the surface of the first half-tube 10 each are provided with the reinforcing rib 14.

Thus, by providing the reinforcing rib 14 on half-open surface structures of the first half-tube 10 and the second half-tube 20 respectively, it is possible to ensure a supporting force for the filtering membrane 30, thereby serving to reinforce a strength of the central tube.

In some embodiments, two ends of the first half-tube 10 each are provided with a first pre-mounting portion beyond the filtering membrane 30, two ends of the second half-tube 20 each are provided with a second pre-mounting portion beyond the filtering membrane 30, and the first pre-mounting portion is connected with the second pre-mounting portion before the filtering membrane 30 is coiled.

That is, in the present application, the two ends of the first half-tube 10 and the two ends of the second half-tube 20 each have a portion where the filtering membrane 30 is not necessary to be coiled, i.e., the first pre-mounting portion and the second pre-mounting portion. When the first half-tube 10, the second half-tube 20, the filtering membrane 30, the input-water filtering net 40 and the produced-water filtering net 50 are arranged in position, the first half-tube 10 and the second half-tube 20 can be first connected through the first pre-mounting portion and the second pre-mounting portion, such that the central tube can be steadily mounted in a coiling machine during a coiling process, thus achieving a mechanized production. When the coiling is completed, the first pre-mounting portion and the second pre-mounting portion can be cut off respectively, and then the upper-end cover 60 and the lower-end cover 70 can be mounted, thereby greatly improving the assembling efficiency.

Figure 6:
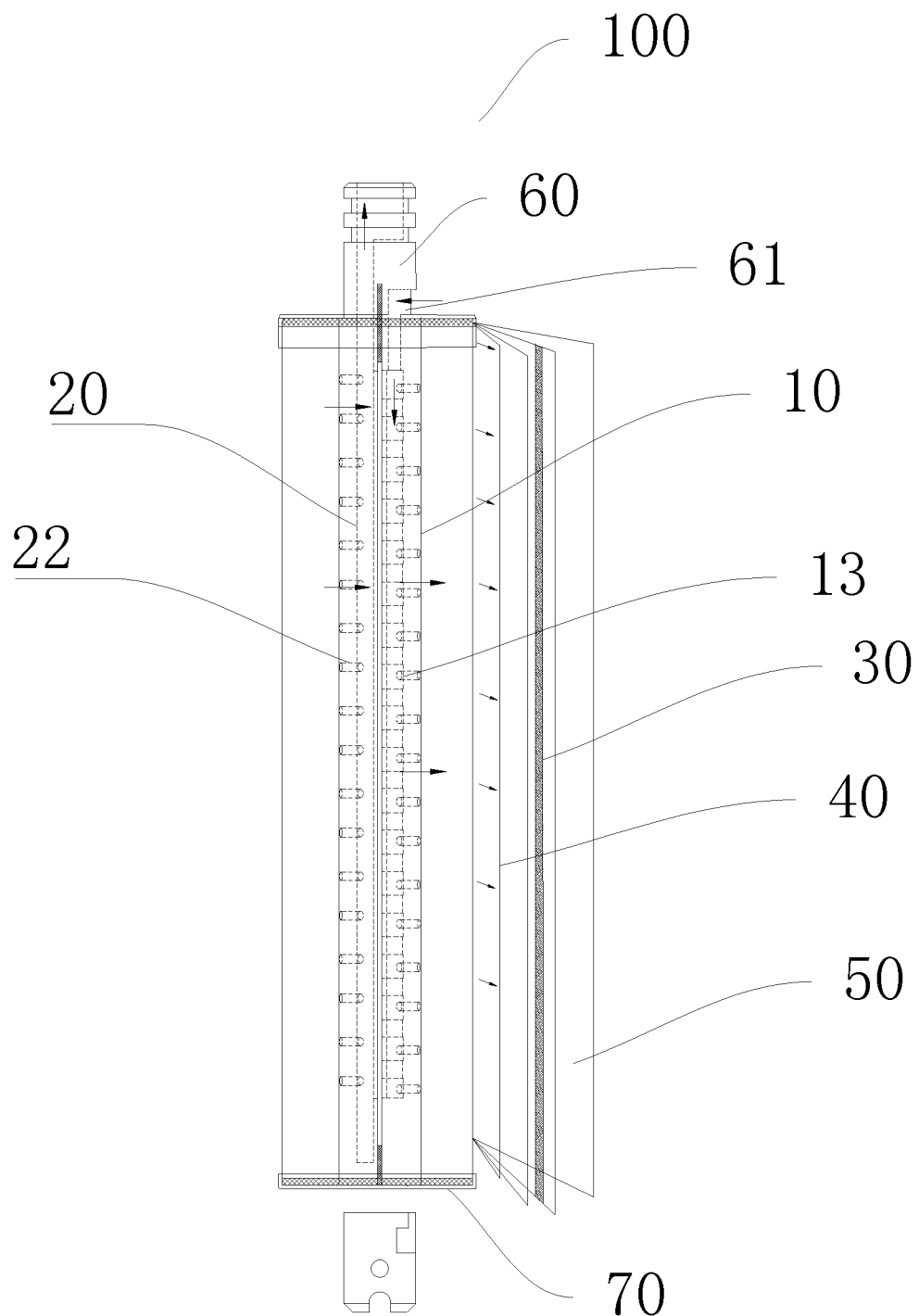
FIG. 6 is an assembling view of a central tube assembly according to embodiments of the present disclosure.

As shown in FIG. 6, in FIG. 6, the first pre-mounting portion at the upper end of the first half-tube 10 and the second pre-mounting portion at the upper end of the second half-tube 20 are in a non-cut-off state, while the first pre-mounting portion at the lower end of the first half-tube 10 and the second pre-mounting portion at the lower end of the second half-tube 20 have been cut off.

In one embodiment, the first pre-mounting portion includes a first upper fitting part 15 provided at the upper end of the first half-tube 10 and a first lower fitting part 16 provided at the lower end of the first half-tube 10. The second pre-mounting portion includes a second upper fitting part 25 provided at the upper end of the second half-tube 20 and a second lower fitting part 26 provided at the lower end of the second half-tube 20. The first upper fitting part 15 and the second upper fitting part 25 are corresponding in structure and connected to form a cylindrical structure, and the first lower fitting part 16 and the second lower fitting part 26 are corresponding in structure and connected to form a cylindrical structure.

In one embodiment, the first pre-mounting portion also includes a first upper bonding part 17 provided at the upper end of the first half-tube 10 and a first lower bonding part 18 provided at the lower end of the first half-tube 10. The first upper bonding part 17 is located below the first upper fitting part 15, and the first lower bonding part 18 is located above the first lower fitting part 16. The second pre-mounting portion also includes a second upper bonding part 27 provided at the upper end of the second half-tube 20 and a second lower bonding part 28 provided at the lower end of the second half-tube 20, the second upper bonding part 27 is located below the second upper fitting part 25, and the second lower bonding part 28 is located above the second lower fitting part 26.

As shown in FIGS. 1 and 3, in the present application, the upper and lower ends of the first half-tube 10 are respectively provided with the first pre-mounting portion, the upper and lower ends of the second half-tube 20 are respectively provided with the second pre-mounting portion, and the first pre-mounting portion can be fitted with the second pre-mounting portion. The first pre-mounting portion includes the first upper fitting part 15 located at the upper end of the first half-tube 10 and the first lower fitting part 16 located at the lower end of the first half-tube 10. The second pre-mounting portion includes the second upper fitting part 25 located at the upper end of the second half-tube 20 and the second lower fitting part 26 located at the lower end of the second half-tube 20.

The first upper fitting part 15 and the second upper fitting part 25 are corresponding in structure and form a cylindrical structure after the first half-tube 10 and the second half-tube 20 are connected. Correspondingly, the first lower fitting part 16 and the second lower fitting part 26 are corresponding in structure and form a cylindrical structure after the first half-tube 10 and the second half-tube 20 are connected. In one embodiment, for example, when the first upper fitting part 15 is configured as a recessed structure, the second upper fitting part 25 is configured as a protrusion structure corresponding to the recessed structure, such that the two structures can substantially form a cylindrical structure after being fitted to each other.

The fitting structure of the first upper fitting part 15 and the second upper fitting part 25 as well as the fitting structure of the first lower fitting part 16 and the second lower fitting part 26, can facilitate the positioning and assembling of the first half-tube 10 and the second half-tube 20, and can also be conveniently cut off after the first half-tube 10 and the second half-tube 20 are wound by the filtering membrane 30, thereby achieving the mechanized production.

The first pre-mounting portion also includes the first upper bonding part 17 and the first lower bonding part 18, and the second pre-mounting portion also includes the second upper bonding part 27 and the second lower bonding part 28. The first upper bonding part 17 and the first lower bonding part 18 are disposed at two ends of the first half-tube 10 respectively and located between the first upper fitting part 15 and the first lower fitting part 16. The second upper bonding part 27 and the second lower bonding part 28 are disposed at two ends of the second half-tube 20 respectively and located between the second upper fitting part 25 and the second lower fitting part 26.

In one embodiment, the lower end of the first half-tube 10 can also be provided with a tooling bayonet 19. The structure of the tooling bayonet 19 facilitates the mounting of a tooling fixture, such that it is more convenient for the assembling of the first half-tube 10 and the second half-tube 20.

According to an embodiment of the present disclosure, the first upper bonding part 17 and the second upper bonding part 27 each are provided with a sealing glue layer, and the first lower bonding part 18 and the second lower bonding part 28 each are also provided with a sealing glue layer.

That is, during the assembling, the first upper bonding part 17 and the first lower bonding part 18, as well as the second upper bonding part 27 and the second lower bonding part 28 can be provided with a small quantity of bonding-surface sealing glue, thereby facilitating the connection between the first upper bonding part 27 and the second upper bonding part 27 as well as the connection between the first lower bonding part 18 and second lower bonding part 28.

In some embodiments, the first pre-mounting portion is integrally formed with the first half-tube 10, and the second pre-mounting portion is integrally formed with the second half-tube 20.

Thus, the structures of the integrally formed first half-tube 10 and the integrally formed second half-tube 20 ensure the overall structural stability and are convenient to be molded, such that the production efficiency is improved and the cost is low.

According to an embodiment of the present disclosure, a distance between the second water inlet 61 and the second water outlet 62 of the upper-end cover 60 is 20-50 mm. Thus, the upper-end cover 60 of this structure facilitates the moldmaking production. In addition, during the moldmaking production, a core pulling may be performed in respect of the first water inlet 12 of the first half-tube 10 and the first water outlet 23 of the second half-tube 20, and can also be performed in respect of the tooling bayonet 19. A core pilling distance is 20-50 mm.

Furthermore, a lower surface of the upper-end cover 60 and an upper surface of the lower-end cover 70 each are provided with a sealing glue layer.

In one embodiment, after the central tube assembly 100 completes the coiling and the first pre-mounting portion and the second pre-mounting portion are cut off, the glue is coated in the upper-end cover 60, the second water inlet 61 of the upper-end cover 60 is fitted and communicated with the first water inlet 12, the second water outlet 62 of the upper-end cover 60 is fitted and communicated with the first water outlet 23, and the upper-end cover 60 tightly presses the upper end of the filtering membrane 30 to form the closed structure, thereby sealing the upper end of the central tube assembly 100.

Then, the glue is coated in the lower-end cover 70, the lower-end cover 70 tightly presses the lower end of the filtering membrane 30 to form the closed structure, so as to seal the lower end of the central tube assembly, such that upper edges of the input-water filtering net 40 and the produced-water filtering net 50 are bonded with the upper end of the filtering membrane 30, and lower edges of the input-water filtering net 40 and the produced-water filtering net 50 are bonded with the lower end of the filtering membrane 30, thereby providing the sealing effects. The central tube assembly 100 is fixed by the upper-end cover 60 and the lower-end cover 70 to form a structure which is sealed at top and bottom, thereby greatly improving the working efficiency and feasibility of assembling.

During the filtration of the central tube assembly 100 according to embodiments of the present disclosure, the raw water enters through the first water inlet 12, flows through the first flow passage 11, enters the filtering membrane 30 through the water output hole 13, and flows along the input-water filtering net 40. Finally, the concentrated water flows out of an outlet of the waste water passage. The produced water penetrates the filtering membrane 30, then flows to the second half-tube 20 along the produced-water filtering net 50, flows through the water input hole 22, further flows through the second flow passage 21, and flows out of the first water outlet 23.

When the central tube assembly 100 according to embodiments of the present disclosure is filtering, during the operations of the membrane elements, the flowing direction of the raw water is all along perpendicular to the direction of the central tube, such that the negative effects caused by changes of the direction of the flowing speed in the membrane can be avoided while ensuring the flowing speed in the membrane, and the pollution-resistance property of the membrane element is improved under the premise of mass production.

A manufacturing method for the central tube assembly 100 for the filter cartridge according to above embodiments of the present disclosure will be described in detail with reference to FIG. 7.

Figure 7:
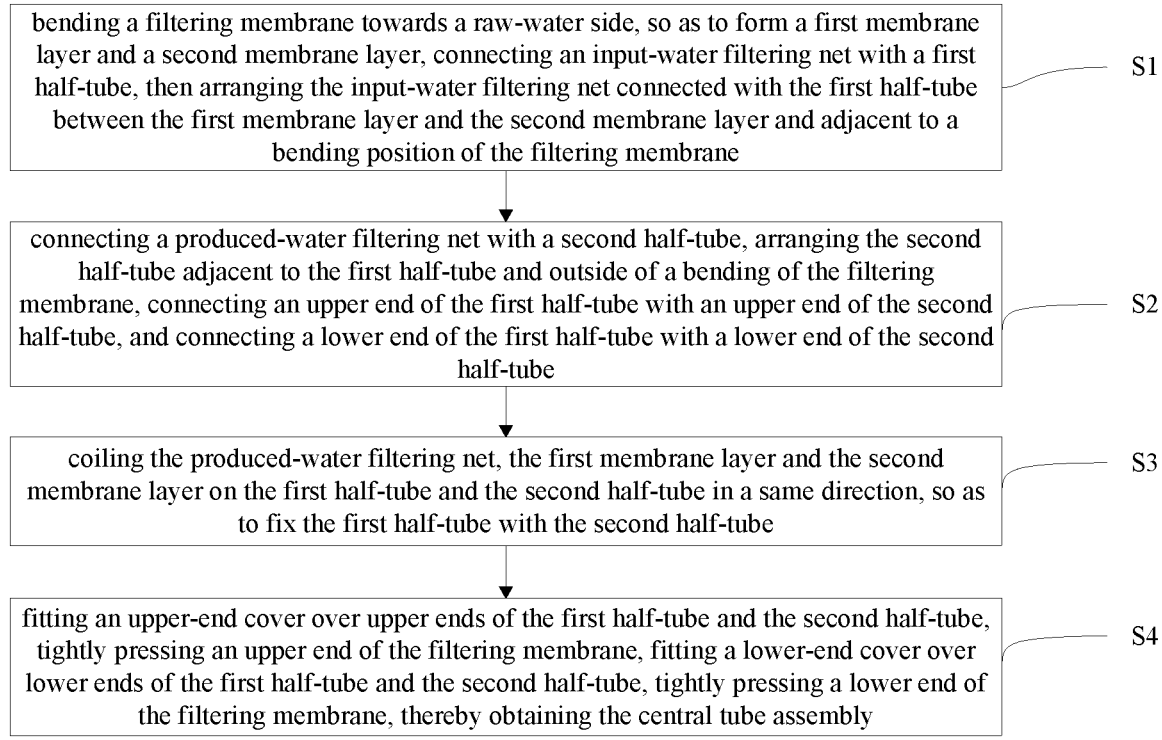
FIG. 7 is a flow chart of a manufacturing method for a central tube assembly according to embodiments of the present disclosure.

In one embodiment, as shown in FIG. 7, the manufacturing method for the central tube assembly 100 for the filter cartridge according to embodiments of the present disclosure includes following method.

At S1, the filtering membrane 30 is bent towards the raw-water side so as to form the first membrane layer and the second membrane layer, the input-water filtering net 40 is connected with the first half-tube 10, and then arranged between the first membrane layer and the second membrane layer and adjacent to the bending position of the filtering membrane 30.

At S2, the produced-water filtering net 50 is connected with the second half-tube 20, the second half-tube 20 is arranged adjacent to the first half-tube 10 and outside of the bending of the filtering membrane 30, upper ends of the first half-tube 10 and the second half-tube 20 are connected, and lower ends of the first half-tube 10 and the second half-tube 20 are connected.

At S3, the produced-water filtering net 50, the first membrane layer and the second membrane layer are coiled on the first half-tube 10 and the second half-tube 20 in a same direction, so as to fix the first half-tube 10 with the second half-tube 20.

At S4, the upper-end cover 60 is fitted over the upper ends of the first half-tube 10 and the second half-tube 20, and tightly presses the upper end of the filtering membrane 30, the lower-end cover 70 is fitted over the lower ends of the first half-tube 10 and the second half-tube 20, and tightly presses the lower end of the filtering membrane 30, thereby obtaining the central tube assembly.

Thus, for the manufacturing method of the central tube assembly 100 according to embodiments of the present disclosure, operability is strong, feasibility is high, the moldmaking production and the mechanized production are easy, and the production cost is reduced.

In one embodiment, two ends of the first half-tube 10 each are provided with the first pre-mounting portion beyond the filtering membrane 30, and two ends of the second half-tube 20 each are provided with the second pre-mounting portion beyond the filtering membrane 30. The first pre-mounting portion and the second pre-mounting portion are connected before the filtering membrane 30 is coiled. The first pre-mounting portion and the second pre-mounting portion are cut off after the filtering membrane 30 completes coiling.

Furthermore, S4 also includes following.

At S41, glue is coated on a lower surface of the upper-end cover 60 and also coated on an upper surface of the lower-end cover 70.

At S42, the upper-end cover 60 is fitted over the upper ends of the first half-tube 10 and the second half-tube 20, the upper-end cover 60 tightly presses the upper end of the filtering membrane 30 to form the sealing glue layer, the lower-end cover 70 is fitted over the lower ends of the first half-tube 10 and the second half-tube 20, the lower-end cover 70 tightly presses the lower end of the filtering membrane 30 to form the sealing glue layer, thereby obtaining the central tube assembly.

In one embodiment, the manufacturing method for the central tube assembly 100 for the filter cartridge according to embodiments of the present disclosure may include the following.

First, the filtering membrane 30 is folded towards the raw-water side, and the raw-water side faces inwards. The first half-tube 10 and the input-water filtering net 40 connected thereto are put in the folded membrane. The first upper fitting part 15 is fitted with the second upper fitting part 25, and the first lower fitting part 16 is fitted with the second lower fitting part 26. The produced-water filtering net 50 is arranged at the produced-water side of the filtering membrane 30. A small amount of upper bonding-surface sealing glue is spread in a bonding position of the first upper bonding part 17 and the second upper bonding part 27, and a small amount of lower bonding-surface sealing glue is spread in a bonding position of the first lower bonding part 18 and the second lower bonding part 28.

Then, the filtering membrane 30, the input-water filtering net 40, the produced-water filtering net 50 are coiled around the central tube constituted by the first half-tube 10 and the second half-tube 20. The sealing glue is spread at ends of two produced-water sides of the filtering membrane 30 away from the central tube, i.e., the produced-water sides of the first membrane and the second membrane. Portions above the first upper bonding part 17 and the second upper bonding part 27 as well as portions below the first lower bonding part 18 and the second lower bonding part 28 are cut off, that is, the first pre-mounting portion and the second pre-mounting portion are cut off.

Then, the glue is coated in the upper-end cover 60, the second water inlet 61 of the upper-end cover 60 is fitted and communicated with the first water inlet 12, and the second water outlet 62 of the upper-end cover 60 is fitted and communicated with the first water outlet 23. The upper-end cover 60 tightly presses the upper end of the filtering membrane 30 to form the closed structure, thereby sealing the upper end of the central tube assembly 100.

Finally, the glue is coated in the lower-end cover 70, and the lower-end cover 70 tightly presses the lower end of the filtering membrane 30 to form the closed structure, so as to seal the lower end of the central tube assembly, such that the upper edges of the input-water filtering net 40 and the produced-water filtering net 50 are bonded with the upper end of the filtering membrane 30, and the lower edges of the input-water filtering net 40 and the produced-water filtering net 50 are bonded with the lower end of the filtering membrane 30, thereby providing the sealing effects. The central tube assembly 100 is fixed by the upper-end cover 60 and the lower-end cover 70 to form a structure which is sealed at top and bottom, thereby greatly improving the working efficiency and feasibility of assembling.

Other components and operations of the central tube assembly 100 for the filter cartridge according to embodiments of the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

The invention claimed is:

1. A central tube assembly for a filter cartridge, comprising:
    a first half-tube, the first half-tube having a first flow passage extending in an axial direction of the first half-tube, an end of the first half-tube having a first water inlet communicated with the first flow passage, a side wall of the first half-tube having a water output hole communicated with the first flow passage;
    a filtering membrane, the filtering membrane having a first side formed as a raw-water side and a second side formed as a produced-water side, the filtering membrane being bent towards the raw-waterside to form a first membrane layer and a second membrane layer, the first half-tube being disposed between the first membrane layer and the second membrane layer and adjacent to a bending position;
    wherein at least one of a surface of the first half-tube and a surface of the second half-tube is provided with a reinforcing rib, in which the surface of the first half-tube is arranged opposite to the surface of the second half-tube, and the reinforcing rib abuts against the filtering membrane;
    an input-water filtering net, the input-water filtering net being connected with the first half-tube, and disposed between the first membrane layer and the second membrane layer to define a waste water passage between the first membrane layer and the second membrane layer;
    a second half-tube, the second half-tube being disposed outside of a bending of the filtering membrane and adjacent to the first half-tube, the second half-tube having a second flow passage extending in an axial direction of the second half-tube, a side wall of the second half-tube having a water input hole communicated with the second flow passage, an end of the second half-tube having a first water outlet communicated with the second flow passage; and
    a produced-water filtering net, the produced-water filtering net being connected with the second half-tube, the produced-water filtering net, the first membrane layer and the second membrane layer being coiled on the first half-tube and the second half-tube in a same direction, wherein the first half-tube is fixed with the second half-tube, the produced-water filtering net being disposed between the first membrane layer and the second half-tube to define a purified water passage between the first membrane layer and the second half-tube, the purified water passage being communicated with the water input hole
    an upper-end cover, the upper-end cover having a second water inlet communicated with the first water inlet and a second water outlet communicated with the first water outlet, the upper-end cover being fitted over upper ends of the first half-tube and the second half-tube, the upper-end cover tightly pressing an upper end of the filtering membrane to seal an upper end of the central tube assembly; and a lower-end cover, the lower-end cover being fitted over lower ends of the first half-tube and the second half-tube, the lower-end cover tightly pressing a lower end of the filtering membrane to seal a lower end of the central tube assembly.

2. The central tube assembly for the filter cartridge according to claim 1, wherein a section of the first half-tube and a section of the second half-tube each have a semicircle shape, the water output hole is provided in an arc surface of the first half-tube, the water input hole is provided in an arc surface of the second half-tube, and a flat surface of the first half-tube is arranged opposite to a flat surface of the second half-tube.

3. The central tube assembly for the filter cartridge according to claim 1, wherein a surface of the first half-tube, which is arranged opposite to the second half-tube, is slotted and provided with the first flow passage, and a surface of the second half-tube, which is arranged opposite to the first half-tube, is slotted and provided with the second flow passage.

4. The central tube assembly for the filter cartridge according to claim 1, wherein two ends of the first half-tube each are provided with a first pre-mounting portion beyond the filtering membrane, two ends of the second half-tube each are provided with a second pre-mounting portion beyond the filtering membrane, and the first pre-mounting portion is connected to the second pre-mounting portion before the filtering membrane is coiled.

5. The central tube assembly for the filter cartridge according to claim 4, wherein the first pre-mounting portion comprises a first upper fitting part provided at an upper end of the first half-tube and a first lower fitting part provided at a lower end of the first half-tube, the second pre-mounting portion comprises a second upper fitting part provided at an upper end of the second half-tube and a second lower fitting part provided at a lower end of the second half-tube, the first upper fitting part and the second upper fitting part are corresponding in structure and connected to form a cylindrical structure, and the first lower fitting part and the second lower fitting part are corresponding in structure and connected to form a cylindrical structure.

6. The central tube assembly for the filter cartridge according to claim 5, wherein the first pre-mounting portion further comprises a first upper bonding part provided at the upper end of the first half-tube and a first lower bonding part provided at the lower end of the first half-tube, the first upper bonding part is located below the first upper fitting part, and the first lower bonding part is located above the first lower fitting part;

the second pre-mounting portion further comprises a second upper bonding part provided at the upper end of the second half-tube and a second lower bonding part provided at the lower end of the second half-tube, the second upper bonding part is located below the second upper fitting part, and the second lower bonding part is located above the second lower fitting part.

7. The central tube assembly for the filter cartridge according to claim 6, wherein the first upper bonding part and the second upper bonding part each are provided with a sealing glue layer, and the first lower bonding part and the second lower bonding part each are provided with a sealing glue layer.

8. The central tube assembly for the filter cartridge according to claim 4, wherein the first pre-mounting portion is integrally formed with the first half-tube, and the second pre-mounting portion is integrally formed with the second half-tube.

9. The central tube assembly for the filter cartridge according to claim 1, wherein a distance between the second water inlet of the upper-end cover and the second water outlet of the upper-end cover is 20-50 mm.

10. The central tube assembly for the filter cartridge according to claim 1, wherein a lower surface of the upper-end cover and an upper surface of the lower-end cover each are provided with a sealing glue layer.

\* \* \* \* \*